US009863482B2

(12) United States Patent
Yamaguchi et al.

(10) Patent No.: US 9,863,482 B2
(45) Date of Patent: Jan. 9, 2018

(54) SHAFT COUPLING MECHANISM FOR ELECTRIC POWER STEERING APPARATUS

(71) Applicant: OILES CORPORATION, Tokyo (JP)

(72) Inventors: Shuichi Yamaguchi, Fujisawa (JP); Noboru Nakagawa, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 15/317,677

(22) PCT Filed: May 27, 2015

(86) PCT No.: PCT/JP2015/002688
§ 371 (c)(1),
(2) Date: Dec. 9, 2016

(87) PCT Pub. No.: WO2015/190054
PCT Pub. Date: Dec. 17, 2015

(65) Prior Publication Data
US 2017/0114837 A1 Apr. 27, 2017

(30) Foreign Application Priority Data

Jun. 11, 2014 (JP) ................................. 2014-120984

(51) Int. Cl.
*F16D 3/74* (2006.01)
*F16D 3/12* (2006.01)
*B62D 5/04* (2006.01)

(52) U.S. Cl.
CPC ................. *F16D 3/74* (2013.01); *F16D 3/12* (2013.01); *B62D 5/04* (2013.01)

(58) Field of Classification Search
CPC ..... B62D 5/04; F16D 3/12; F16D 3/72; F16D 3/725; F16D 3/74

(Continued)

(56) References Cited

U.S. PATENT DOCUMENTS 7,699,709 B2* 4/2010 Kubota ..................... F16D 3/68
464/73
2002/0189892 A1 12/2002 Appleyard
(Continued)

FOREIGN PATENT DOCUMENTS

JP 61-218832 9/1986
JP 2002-518242 6/2002
(Continued)

OTHER PUBLICATIONS

International Search Report for PCT/JP2015/002688, dated Sep. 1, 2015, 4 pages.

Primary Examiner — Josh Skroupa
(74) Attorney, Agent, or Firm — Nixon & Vanderhye P.C.

(57) ABSTRACT

A shaft coupling mechanism 1 for an electric power steering apparatus includes a coupling base body 3 coupled to a rotating shaft 2; a coupling base body 5 coupled to a rotating shaft 4; a rotation transmitting member 8 constituted by a pair of rigid rotation transmitting members 6 and 7 disposed between the rotating shaft 2 and the rotating shaft 4 through both coupling base bodies 3 and 5 and adapted to transmit the rotation of the rotating shaft 2 in an R direction about an axis O to the rotating shaft 4; an elastic member 9 interposed between the rotation transmitting members 6 and 7 and coupled to the rotation transmitting members 6 and 7 in such a manner as to be axially superposed on the rotation transmitting members 6 and 7; and a coupling means 10 for coupling the pair of rotation transmitting members 6 and 7 to each other.

16 Claims, 9 Drawing Sheets

(58) Field of Classification Search
USPC .......................... 464/73, 76, 85, 93–95, 157
See application file for complete search history.

(56) References Cited

U.S. PATENT DOCUMENTS

2005/0072620 A1    4/2005  Joushita
2008/0128195 A1    6/2008  Kubota et al.

FOREIGN PATENT DOCUMENTS

| JP | 2004-068943 | 3/2004 |
| JP | 2004-148990 | 5/2004 |
| JP | 2004-149070 | 5/2004 |
| JP | 2006-183676 | 7/2006 |
| JP | 2010-196863 | 9/2010 |
| WO | WO 2014/073526 | 5/2014 |

* cited by examiner

SHAFT COUPLING MECHANISM FOR ELECTRIC POWER STEERING APPARATUS

This application is the U.S. national phase of International Application No. PCT/JP2015/002688 filed 27 May 2015, which designated the U.S. and claims priority to JP Patent Application No. 2014-120984 filed 11 Jun. 2014, the entire contents of each of which are hereby incorporated by reference.

TECHNICAL FIELD

The present invention relates to a shaft coupling mechanism suitable for coupling a rotating shaft on a rotating source side such as an electric motor in an electric power steering apparatus and a rotating shaft on an operating side such as a steering shaft of an automobile.

BACKGROUND ART

An electric power steering apparatus is for facilitating the manual steering of a steering wheel by adding a torque based on the rotation of an output rotating shaft of an electric motor to a torque based on the rotation of the steering wheel which is manually operated. In such an electric power steering apparatus, the steering shaft on the steering wheel side and the rotating shaft on the output rotating shaft side of the electric motor are coupled by means of a shaft coupling mechanism (a coupling).

In the case where the steering shaft and the rotating shaft are coupled by means of the shaft coupling mechanism, there is a possibility that an impact at the time of the reversing of the output rotating shaft of the electric motor and the vibration of the brushes of the electric motor are transmitted to the steering wheel through the shaft coupling mechanism and the steering shaft, thereby causing an unpleasant steering feel to the driver. To avoid this, it has been proposed to provide a spacer made of such as rubber or soft resin for the shaft coupling mechanism.

PRIOR ART DOCUMENTS

Patent Documents

Patent document 1: JP-T-2002-518242
Patent document 2: JP-A-2004-148990
Patent document 3: JP-A-2004-149070
Patent document 4: JP-A-2006-183676

SUMMARY OF THE INVENTION

Problems that the Invention is to Solve

Incidentally, Patent Document 4 discloses a shaft coupling mechanism in which a pair of rigid rotation transmitting members disposed between the rotating shaft on the electric motor side and the rotating shaft on the steering side to transmit the rotation of the rotating shaft on the electric motor side to the rotating shaft on the steering side and a resilient elastic member interposed between the pair of rotation transmitting members are mounted on the rotating shafts. In such a shaft coupling mechanism, however, if an axial displacement (axial misalignment) occurs between both rotating shafts, and the rotating shaft and the rotation transmitting member collide against each other in the radial direction, since the rotating shaft and the rotation transmitting member are mutually rigid, abnormal noise (collision noise) is generated. If such a shaft coupling mechanism is used for an electric power steering apparatus of an automobile, discomfort is imparted to the occupant of the automobile, and an unpleasant steering feel is imparted particularly to the driver.

The present invention has been devised in view of the above-described problems, and its object is to provide a shaft coupling mechanism for an electric power steering apparatus which makes it possible to avoid the radial collision between the rotating shaft and the rotation transmitting member and suppress the generation of the abnormal noise which imparts an unpleasant steering feel to the driver.

Means for Overcoming the Problems

A shaft coupling mechanism in accordance with the present invention for coupling a first rotating shaft and a second rotating shaft by being disposed between the first and the second rotating shafts so as to transmit the rotation of the first rotating shaft to the second rotating shaft comprises: a rigid rotation transmitting member; and an elastic member superposed on the rotation transmitting member in an axial direction, wherein the rotation transmitting member includes a first base portion having a first inner peripheral surface and a first outer peripheral surface which are cylindrical and at least one pair of first radial projecting portions spaced apart from each other in a direction about an axis and extending radially from the first outer peripheral surface, and wherein the elastic member includes a second base portion superposed on the first base portion in the axial direction and having a second inner peripheral surface and a second outer peripheral surface which are cylindrical and at least one pair of second radial projecting portions respectively superposed on the first radial projecting portions of the rotation transmitting member in the axial direction and extending radially from the second outer peripheral surface, the second base portion having a smaller rigidity than a rigidity of the first base portion and being elastically deformable, each of the pair of second radial projecting portions having a smaller rigidity than a rigidity of the pair of first radial projecting portions, being elastically deformable, and having a greater width than a width in the direction about the axis of the first radial projecting portions superposed on the second radial projecting portions in the axial direction, the second inner peripheral surface having a smaller diameter than a diameter of the first inner peripheral surface.

According to the shaft coupling mechanism in accordance with the present invention, the second inner peripheral surface of the elastic member has a smaller diameter than the diameter of the first inner peripheral surface of the rigid rotation transmitting member, so that in a case where one of the first rotating shaft and the second rotating shaft is inserted in a through hole defined by the second inner peripheral surface, even if an axial misalignment occurs between the first rotating shaft and the second rotating shaft, the contact and collision of the one rotating shaft with and against the first inner peripheral surface of the rigid rotation transmitting member can be prevented by the elastic member, which hence makes it possible to avoid the radial collision between the rotating shaft and the rotation transmitting member, making it possible to suppress the generation of abnormal noise imparting an unpleasant steering feel to the driver.

In addition, according to the shaft coupling mechanism in accordance with the present invention, each of the pair of second radial projecting portions has a smaller rigidity than the rigidity of the pair of first radial projecting portions of the rotation transmitting member, is elastically deformable, and has a greater width than the width in the direction about the axis of the first radial projecting portions superposed on the second radial projecting portions in the axial direction. Therefore, the transmission of the rotation of the one rotating shaft to the other rotating shaft is effected through the elastic deformation of the pair of second radial projecting portions of the elastic member, with the result that the transmission of a very small degree of rotation of the one rotating shaft to the other rotating shaft can be reduced or prevented by the elastic deformation of the pair of second radial projecting portions of the elastic member, and the transmission to the other rotating shaft of a large degree of relative rotation of the one rotating shaft with respect to the other rotating shaft can be effected as it is through the rotation transmitting member having a greater rigidity than the pair of second radial projecting portions of the elastic member. Moreover, in the elastic deformation of the pair of radial projecting portions of the elastic member by a fixed degree or more in the direction about the axis, large deformation of the pair of radial projecting portions of the elastic member can be prevented by the rotation transmitting member having a large rigidity, so that it is possible to reduce mechanical fatigue due to the large deformation of the elastic member, and in a case where a pliable resin material having a small rigidity is used for the elastic member, permanent set of the elastic member due to creep of the resin material can be reduced.

In the present invention, the rotation transmitting member is preferably formed of a hard resin such as polyacetal resin, polyamide resin, or the like, but may be formed of another hard resin exhibiting rigidity, while the elastic member may be formed, in its entirety, of a rubber elastomer such as urethane rubber, polyester elastomer, or the like. Alternatively, the elastic member may be constituted by a so-called two-color molding which consists of a core portion formed of a hard resin in the same way as the rotation transmitting member and a covering portion covering the core portion and formed of rubber such as urethane rubber, polyester elastomer, or the like. For example, the second base portion of the elastic member may have a core portion formed of a hard resin exhibiting rigidity such as polyacetal resin, polyamide resin, or the like and a covering portion covering the core portion and formed of rubber elastomer such as urethane rubber, polyester elastomer, or the like which has a smaller rigidity than the rigidity of the first radial projecting portions and is elastically deformable. The contact and collision of the one rotating shaft with or against the first inner peripheral surface of the rigid rotation transmitting member may be elastically prevented by the covering portion of the second base portion. Similarly, each of the pair of second radial projecting portions of the elastic member may have a core portion formed of a hard resin such as polyacetal resin, polyamide resin, or the like and a covering portion covering the core portion and formed of a rubber elastomer such as urethane rubber, polyester elastomer, or the like which has a smaller rigidity than the rigidity of the first radial projecting portions and is elastically deformable. The transmission of a very small degree of rotation of the one rotating shaft to the other rotating shaft can be reduced or prevented by the elastic deformation of the covering portions of the pair of second radial projecting portions. In addition, the entirety of the pair of second radial projecting portions or their covering portions may not necessarily be formed of a rubber elastomer such as urethane rubber, polyester elastomer, or the like, and each of the pair of second radial projecting portions may, for example, be formed with radially extending gaps so as to be able to undergo elastic flexural deformation in the direction about the axis.

In a preferred embodiment of the shaft coupling mechanism in accordance with the present invention, the rotation transmitting member includes a first and a second rotation transmitting member, and the elastic member is interposed between the first and the second rotation transmitting members in the axial direction, each of the first and the second rotation transmitting members having the first base portion and the pair of first radial projecting portions, the second base portion being disposed between the first base portions of the first and the second rotation transmitting members in the axial direction, having a smaller rigidity than a rigidity of the first base portion of each of the first and the second rotation transmitting members, and being elastically deformable, the pair of second radial projecting portions being disposed between the first radial projecting portions of the first and the second rotation transmitting members in the axial direction, having a smaller rigidity than a rigidity of each of the pair of first radial projecting portions of the first and the second rotation transmitting members, being elastically deformable, and having a greater width than the width in the direction about the axis in the first radial projecting portions with the second radial projecting portions interposed therebetween in the axial direction, the second inner peripheral surface having a smaller diameter than the diameter of the first inner peripheral surface of each of the first and the second rotation transmitting members.

In such a preferred embodiment, the elastic member is sandwiched between the first and the second rotation transmitting members in the axial direction, and the second inner peripheral surface of the elastic member has a smaller diameter than the diameter of the first inner peripheral surfaces of the first and the second rotation transmitting members. Therefore, in a case where a shaft is inserted in a through hole defined by the second inner peripheral surface, even if an axial misalignment occurs between the first rotating shaft and the second rotating shaft, the contact and collision of the shaft with and against the first inner peripheral surfaces of the first and the second rotation transmitting members can be prevented by the elastic member, which hence makes it possible to avoid the radial collision between the rotating shaft and the rotation transmitting member, making it possible to suppress the generation of abnormal noise imparting an unpleasant steering feel to the driver. Further, the rotation of the first rotating shaft can be transmitted to the second rotating shaft by the two rotation transmitting members consisting of the first and the second rotation transmitting members, and durability can be improved.

In the above-described preferred embodiment, the shaft coupling mechanism may further comprise coupling means for coupling the first and the second rotation transmitting members. This coupling means in a preferred embodiment includes a first coupling member provided integrally on the first base portion of the first rotation transmitting member in such a manner as to extend from one axial end face of the first base portion of the first rotation transmitting member toward the first base portion of the second rotation transmitting member and latched at a distal end thereof by the first base portion of the second rotation transmitting member at one axial end face of the first base portion of the second rotation transmitting member; and a second coupling member provided integrally on the first base portion of the second rotation transmitting member in such a manner as to extend from another axial end face of the first base portion of the second rotation transmitting member toward the first base portion of the first rotation transmitting member and latched at a distal end thereof by another axial end face of the first base portion of the first rotation transmitting member. In this embodiment recessed portions which are spaced apart from each other in the direction about the axis, and in which the first and the second coupling members are respectively fitted, may be provided in the second inner peripheral surface.

In the preferred embodiment of the shaft coupling mechanism in accordance with the present invention comprising the first and the second rotation transmitting members, if the first and the second rotation transmitting members are coupled to each other through the coupling means, as described above, it is possible to improve assembling efficiency and eliminate the mutual separation of the first and the second rotation transmitting members in the axial direction due to the elastic deformation of the elastic member, thereby making it possible to suppress the first and the second rotation transmitting members from spreading in the axial direction to a fixed extent. In addition, if the first and the second coupling members are respectively fitted in the recessed portions provided in the second inner peripheral surface in such a manner as to be spaced apart from each other in the direction about the axis, the elastic member is positioned with respect to the first and the second rotation transmitting members through the first and the second coupling members, with the result that the effect derived from the elastic member can be obtained uniformly with respect to the relative rotation in both directions of the first and the second rotating shafts.

Each of the first and the second coupling members in a preferred embodiment has a coupling base body which is provided integrally with a corresponding one of the first base portions of the first and the second rotation transmitting members in such a manner as to extend in the axial direction and which is fitted in a corresponding one of the recessed portions and a hook provided integrally on a radially outer surface of the coupling base body and latched by the other axial end face of a corresponding one of the first base portions of the first and the second rotation transmitting members, each of the coupling base bodies having a smaller radial thickness than a depth of the recessed portions. Further, each of the recessed portions has a first recess which is open at the second inner peripheral surface and a second recess which communicates with the first recess and in which a corresponding one of the coupling base bodies is fitted, and each of the coupling base bodies has a smaller radial thickness than a sum of a depth of the first recess and a depth of the second recess or a radial thickness identical to or smaller than the thickness of the second recess. If each of the coupling base bodies thus has a smaller radial thickness than the depth of the recessed portions, preferably a smaller radial thickness than the sum of the depth of the first recess and the depth of the second recess, more preferably a radial thickness identical to or smaller than the thickness of the second recess, the radially inward protrusion of each coupling base body from the recessed portion can be eliminated, so that the contact and collision of the coupling base body with and against the one rotating shaft can be obviated In the shaft coupling mechanism in accordance with the present invention, at least one rotation transmitting member and at least one elastic member which are disposed between two rotating shafts may be provided as spacers in the direction about the axis. In a preferred embodiment, however, the shaft coupling mechanism further comprises: a first coupling base body which is coupled to the first rotating shaft and a second coupling base body which is coupled to the second rotating shaft, wherein the first coupling base body has a first coupling base portion and a first axial projecting portion projecting integrally in the axial direction from the first coupling base portion, and the second coupling base body has a second coupling base portion and a second axial projecting portion projecting integrally in the axial direction from the second coupling base portion, and at least one of the first coupling base body and the second coupling base body has a shaft which extends in the axial direction from a central portion of one axial end face thereof and is passed through a through hole defined by the first inner peripheral surface of the rotation transmitting member and a thorough hole defined by the second inner peripheral surface of the elastic member, the first axial projecting portion being disposed in one gap between adjacent ones of the first radial projecting portions among the pairs of first radial projecting portions in the direction about the axis and in one gap between adjacent ones of the second radial projecting portions among the pairs of second radial projecting portions in the direction about the axis, the second axial projecting portion being disposed in another gap between adjacent ones of the first radial projecting portions among the pairs of first radial projecting portions in the direction about the axis and in another gap between adjacent ones of the second radial projecting portions among the pairs of second radial projecting portions in the direction about the axis. In this case, in order to ensure that a free play does not occur in the relative initial rotation of the one rotating shaft with respect to the other rotating shaft, in the relative rotation by a fixed degree or less of the first and the second rotating shafts, the first and the second axial projecting portions at respective side surfaces thereof in the direction about the axis may be in contact with side surfaces in the direction about the axis of the second radial projecting portions opposing thereto in the direction about the axis, may be adapted to be, in the relative rotation by the fixed degree or less of the first and the second rotating shafts, in non-contact with, and may be adapted to be, in the relative rotation by the fixed degree or more of the first and the second rotating shafts, brought into contact with, side surfaces in the direction about the axis of the first radial projecting portions opposing thereto in the direction about the axis. Although the first coupling base body may be directly coupled and secured to the one rotating shaft, the first coupling base body may be indirectly coupled to the one rotating shaft through another rotation transmitting mechanism such as a gear mechanism, and the same applies to the other coupling base body of the second coupling base body as well.

In the above-described embodiment, the shaft may be constituted by a shaft portion which is provided integrally on a central portion of the axial end face of at least one of the first coupling base body and the second coupling base body, or the shaft may be constituted by an axial shaft end portion of at least one of the first rotating shaft and the second rotating shaft, and the second outer peripheral surface may have a greater diameter than a diameter of the first outer peripheral surface. If the second outer peripheral surface has such a diameter, even if an axial misalignment occurs between the first rotating shaft and the second rotating shaft, the contact and collision of the radial inner surface of each of the first axial projecting portions and the second axial projecting portions with and against the first outer peripheral surface can be prevented by the elastic member, which hence makes it possible to avoid the radial collision between, on the one hand, the first axial projecting portions and the second axial projecting portions and, on the other hand, the first base portions. This also makes it possible to suppress the generation of abnormal noise imparting an unpleasant steering feel to the driver.

In the present invention, each of the first axial projecting portion and the second axial projecting portion may have a radial inner surface which is brought into contact with the second outer peripheral surface.

In the preferred embodiment, each of the projecting portions of the rotation transmitting member which oppose the projecting portions of the elastic member in the axial direction is formed intermediately high in the direction about the axis, such that its central portion in the direction about the axis is brought into contact with the opposing projecting portion of the elastic member, whereas edge portion thereof in the direction about the axis forms a void space with respect to the opposing projecting portion of the elastic member. If such a void space is formed, the bulging of the edge portion in the direction about the axis in the pair of projecting portions of the elastic member due to elastic deformation can be absorbed by the void space, with the result that the mutual separation of the axially mutually opposing projecting portions of the rotation transmitting members can be obviated, and it is hence possible to effect stable transmission of torque.

The shaft coupling mechanism in accordance with the present invention may be for use in an electric power steering apparatus, in which case the first rotating shaft may be adapted to be coupled to an output rotating shaft of an electric motor, and the second rotating shaft may be adapted to be coupled to a steering shaft of an automobile.

Advantages of the Invention

According to the present invention, it is possible to provide a shaft coupling mechanism for an electric power steering apparatus which makes it possible to avoid the radial collision between the rotating shaft and the rotation transmitting member and suppress the generation of the abnormal noise which imparts an unpleasant steering feel to the driver.

MODE FOR CARRYING OUT THE INVENTION

Figure 1:
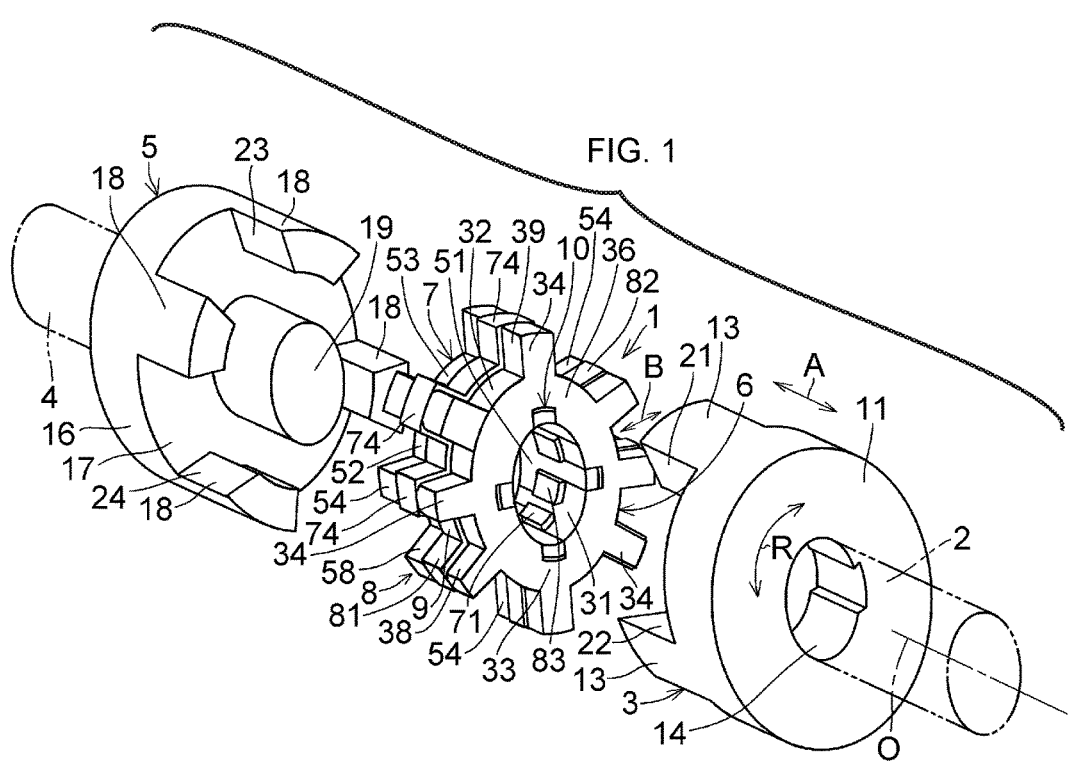
FIG. 1 is an exploded perspective view of a preferred embodiment of the present invention.

Next, a more detailed description will be given of the mode for carrying out the invention on the basis of a preferred embodiment illustrated in the drawings. It should be noted that the present invention is not limited to such an embodiment.

Figure 2:
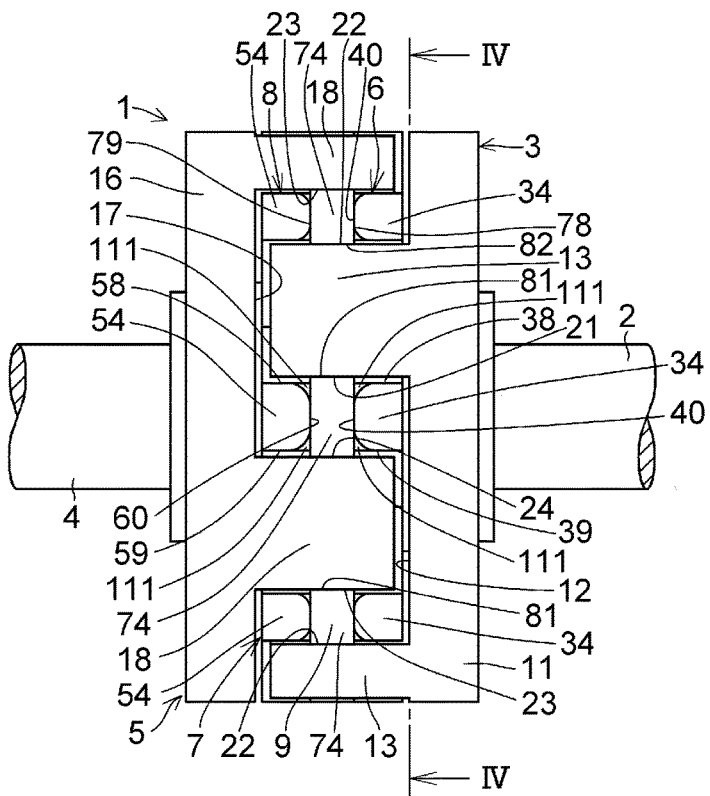
FIG. 2 is a front elevational view of the embodiment shown in FIG. 1.
Figure 3:
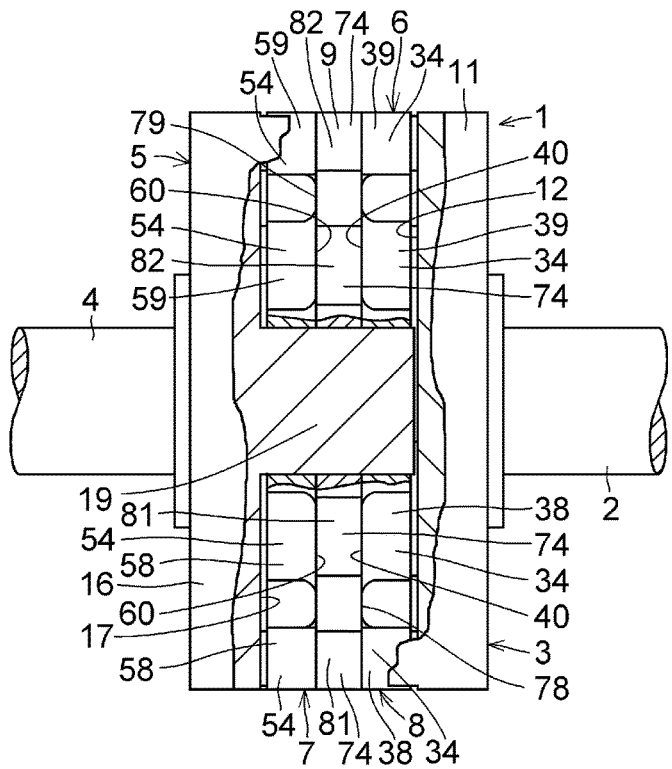
FIG. 3 is a partially cutaway front elevational view of FIG. 2 of the embodiment shown in FIG. 1.
Figure 4:
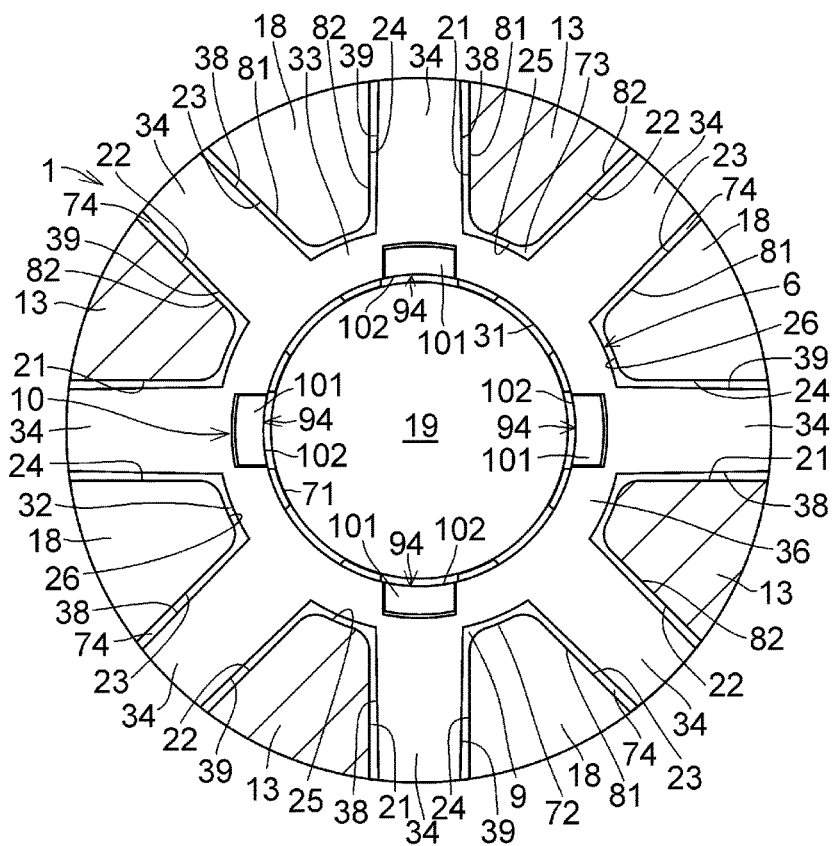
FIG. 4 is a cross-sectional view taken in the direction of arrows along line IV-IV shown in FIG. 2.
Figure 5:
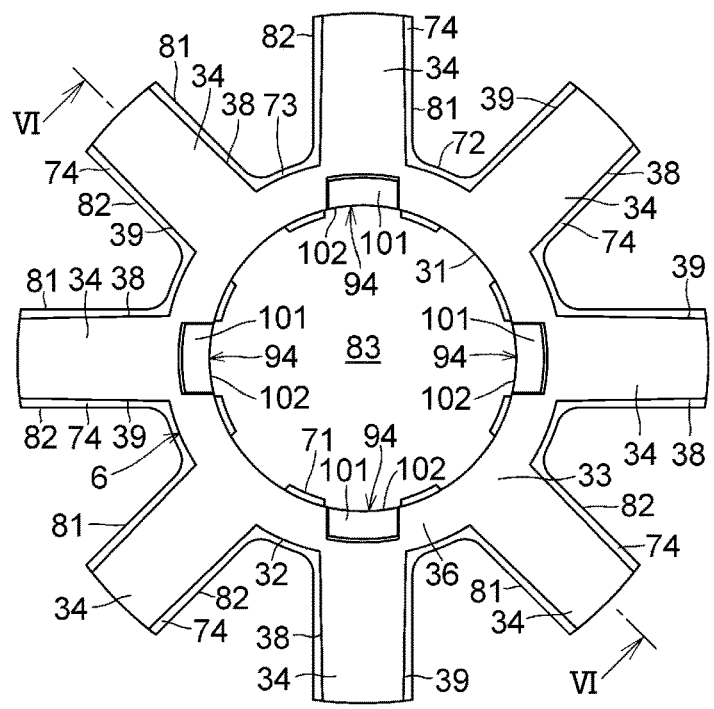
FIG. 5 is an explanatory right side view of a combination of a rotation transmitting member and an elastic member of the embodiment shown in FIG. 1.
Figure 6:
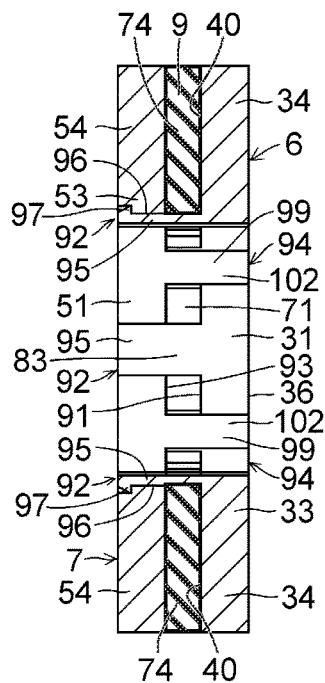
FIG. 6 is an explanatory cross-sectional view taken in the direction of arrows along line VI-VI shown in FIG. 5.
Figure 7:
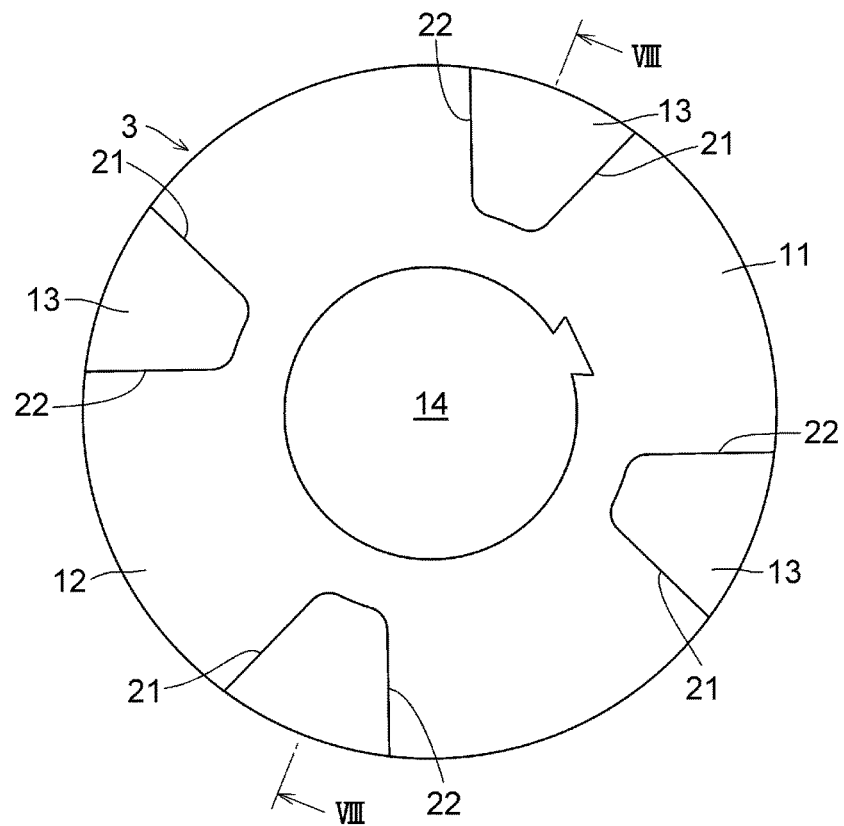
FIG. 7 is an explanatory left side view of a coupling base body on an electric motor side of the embodiment shown in FIG. 1.
Figure 8:
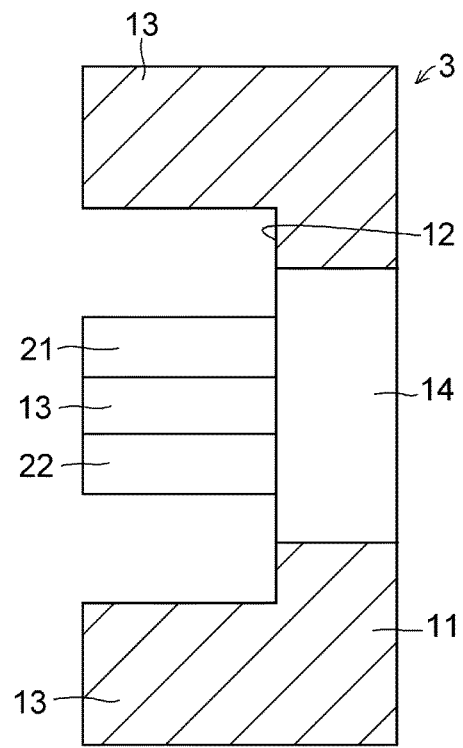
FIG. 8 is an explanatory cross-sectional view taken in the direction of arrows along line VIII-VIII shown in FIG. 7.
Figure 9:
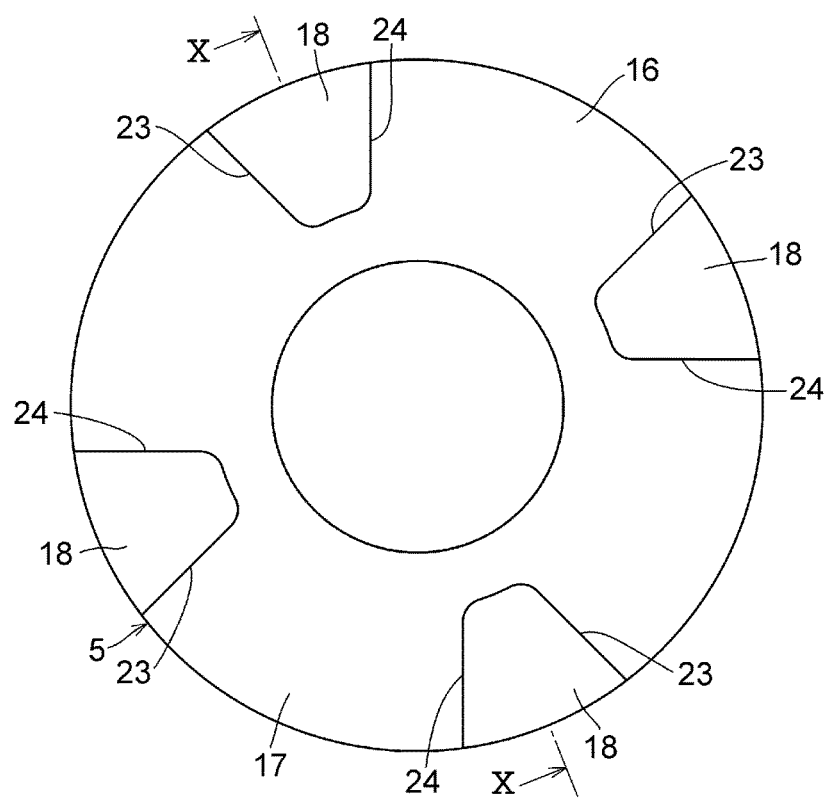
FIG. 9 is an explanatory right side view of a coupling base body on a steering shaft side of the embodiment shown in FIG. 1.
Figure 10:
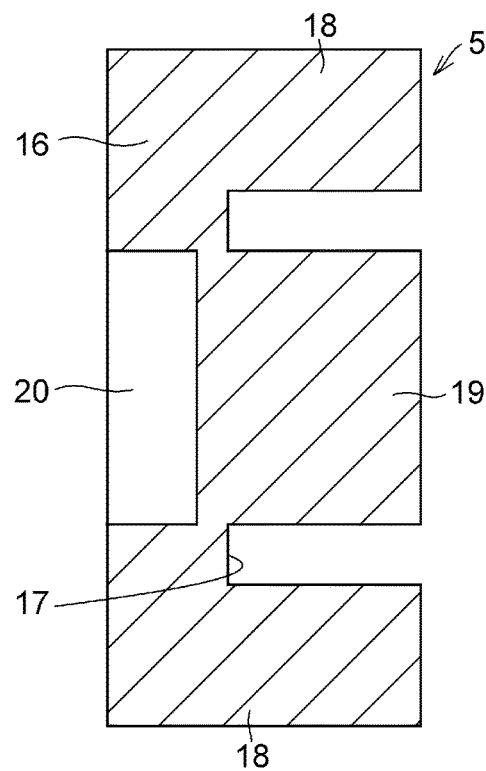
FIG. 10 is an explanatory cross-sectional view taken in the direction of arrows along line X-X shown in FIG. 9.
Figure 11:
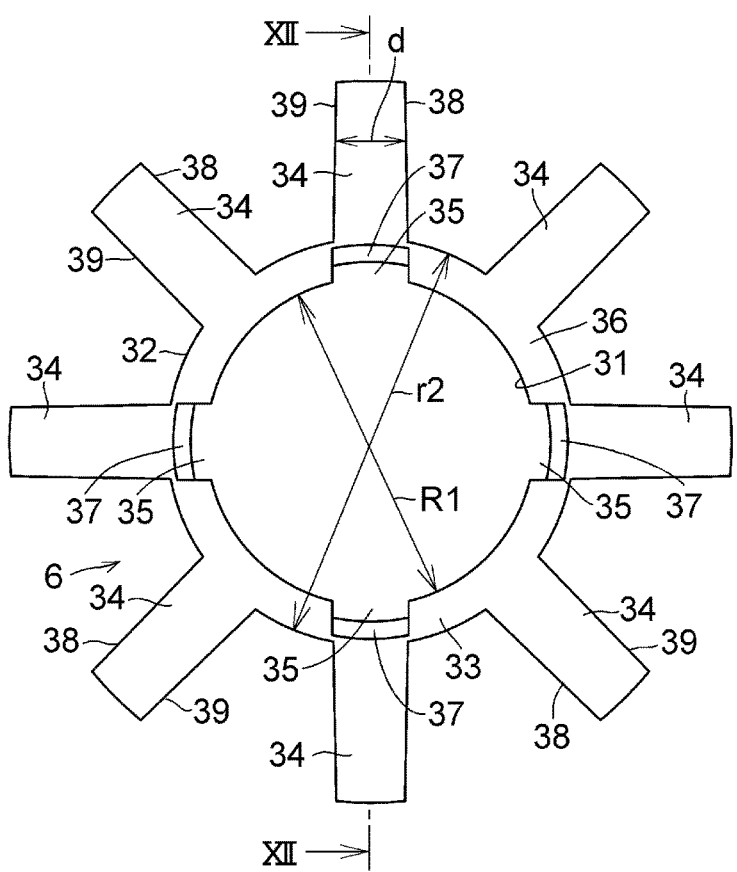
FIG. 11 is an explanatory right side view of a rotation transmitting member on the electric motor side of the embodiment shown in FIG. 1.
Figure 12:
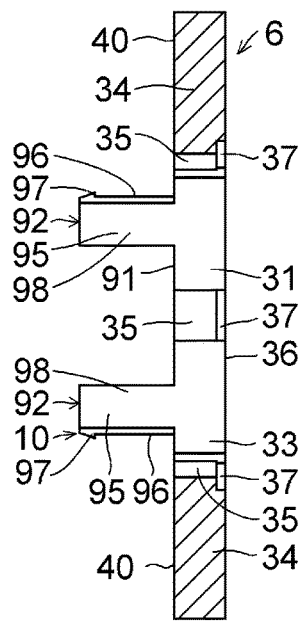
FIG. 12 is an explanatory cross-sectional view taken in the direction of arrows along line XII-XII shown in FIG. 11.
Figure 13:
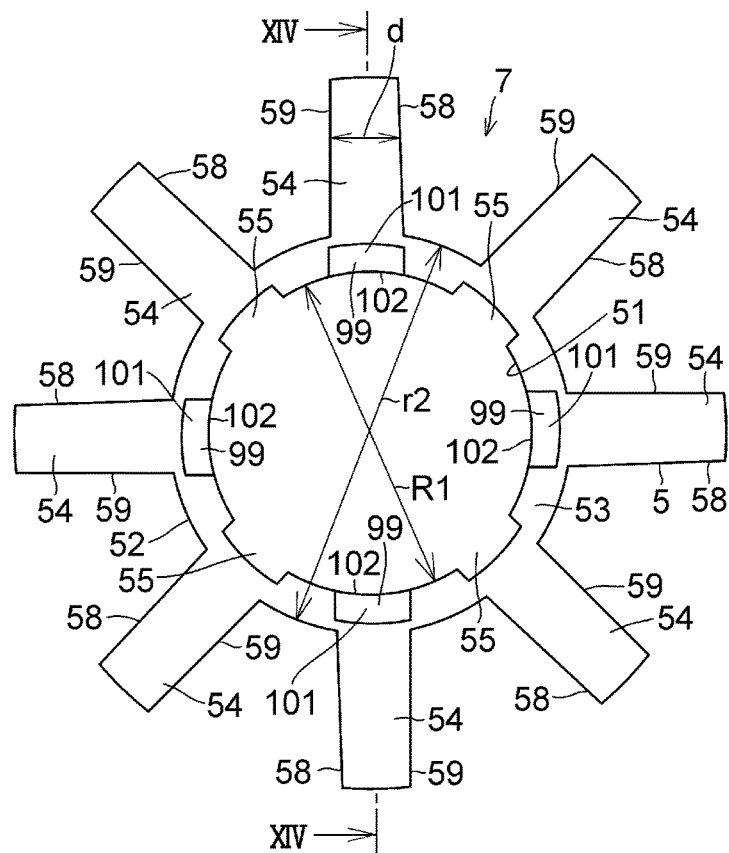
FIG. 13 is an explanatory right side view of a rotation transmitting member on the steering shaft side of the embodiment shown in FIG. 1.
Figure 14:
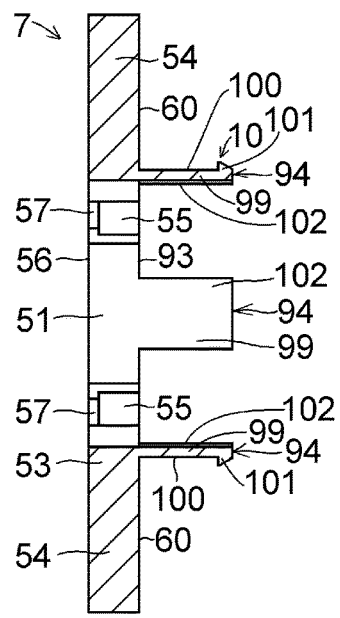
FIG. 14 is an explanatory cross-sectional view taken in the direction of arrows along line XIV-XIV shown in FIG. 13.
Figure 15:
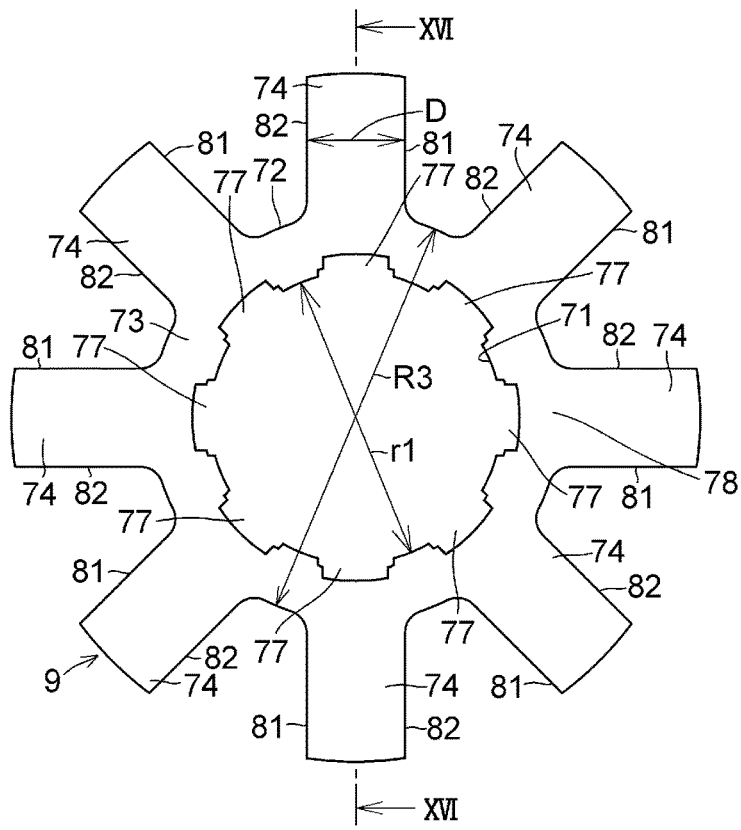
FIG. 15 is an explanatory right side view of an elastic member of the embodiment shown in FIG. 1.
Figure 16:
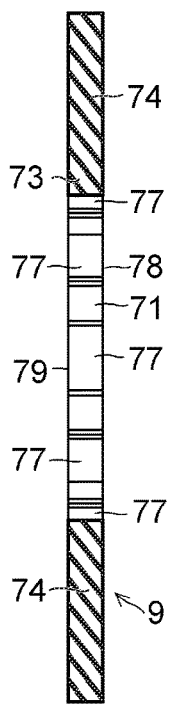
FIG. 16 is an explanatory cross-sectional view taken in the direction of arrows along line XVI-XVI shown in FIG. 15.
Figure 17:
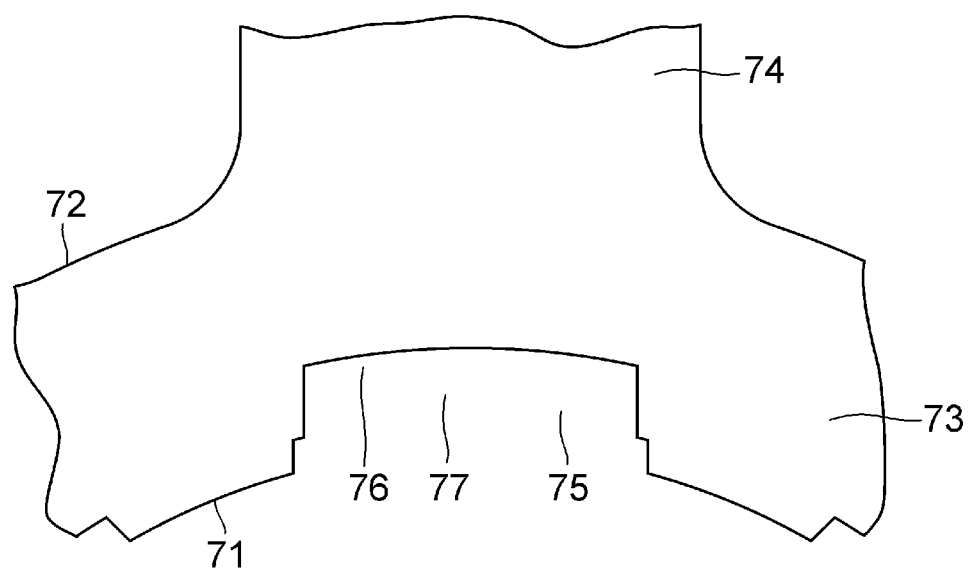
FIG. 17 is an explanatory partially enlarged right side view of the elastic member of the embodiment shown in FIG. 1.

In FIGS. 1 to 17, a shaft coupling mechanism 1 for an electric power steering apparatus in accordance with this embodiment is comprised of a coupling base body 3 coupled to a rotating shaft 2; a coupling base body 5 coupled to a rotating shaft 4; a rotation transmitting member 8 constituted by a pair of rigid rotation transmitting members 6 and 7 disposed between the rotating shaft 2 and the rotating shaft 4 through both coupling base bodies 3 and 5 and adapted to transmit the rotation of the rotating shaft 2 in an R direction about an axis O to the rotating shaft 4; an elastic member 9 interposed between the rotation transmitting members 6 and 7 and coupled to the rotation transmitting members 6 and 7 in such a manner as to be axially superposed on the rotation transmitting members 6 and 7; and a coupling means 10 for coupling the pair of rotation transmitting members 6 and 7 to each other.

The rotating shaft 2 is a rotating shaft on the electric motor side of an electric power steering apparatus and is adapted to be coupled to, for instance, an output rotating shaft of the electric motor, while the rotating shaft 4 is a rotating shaft on the steering shaft side of the automobile and is adapted to be coupled, for instance, to a steering shaft of the automobile.

The coupling base body 3 which is rigid includes an annular coupling base portion 11; two pairs of axial projecting portions 13 which are integrally formed on one annular surface 12 of the coupling base portion 11 in such a manner as to project from the annular surface 12 in an axial direction, i.e., an A direction, and are arranged at equiangular intervals of 90° in the direction about the axis O, i.e., in the R direction; and a through hole 14 into which one end portion of the rotating shaft 2 is fittingly secured through a key and a key groove. The coupling base body 5 which is rigid includes a circular coupling base portion 16; two pairs of axial projecting portions 18 which are integrally formed on one circular end face 17 in the A direction of the coupling base portion 16 in such a manner as to project from the end face 17 in the A direction, and are arranged at equiangular intervals of 90° in the R direction; a shaft portion 19 serving as a shaft and provided integrally on a central portion of the end face 17 of the coupling base portion 16 in such a manner as to project from the central portion of the end face 17 and extend in the A direction; and a recessed portion 20 into which one end portion of the rotating shaft 4 is fittingly secured through a key and a key groove.

Each of the axial projecting portions 13 has in the R direction a pair of side surfaces 21 and 22 serving as rigid rotation transmitting surfaces, and each of the axial projecting portions 18 also has in the R direction a pair of side surfaces 23 and 24 serving as rigid rotation transmitting surfaces. The axial projecting portions 13 and 18 have inner surfaces 25 and 26 extending in a radial direction, i.e., a B direction.

The rigid rotation transmitting member 6, which is integrally formed of polyacetal resin, polyamide resin, or the like, includes an annular base portion 33 disposed concentrically with the coupling base portion 11 and having an inner peripheral surface 31 and an outer peripheral surface 32 which are cylindrical; four pairs of radial projecting portions 34 which are provided integrally with the base portion 33 in such a manner as to extend in the B direction from a cylindrical outer peripheral surface 32 of the base portion 33 and are arranged in such a manner as to be spaced apart from each other at equiangular intervals of 45° in the R direction; four grooves 35 having an identical depth and provided on the cylindrical inner peripheral surface 31 of the base portion 33 in such a manner as to extend in the A direction and to be spaced apart from each other at equiangular intervals of 90° in the R direction; and four retaining grooves 37 which are respectively connected to one ends of the grooves 35 and are provided on the inner peripheral surface 31 of the base portion 33, specifically on one annular end face 36 in the A direction of the base portion 33 opposing the annular surface 12.

Each of the radial projecting portions 34 has side surfaces 38 and 39 serving as a pair of rigid rotation transmitting surfaces in the R direction, and surfaces 40 of the radial projecting portions 34 opposing the elastic member 9 in the A direction are intermediately high in the R direction.

The rigid rotation transmitting member 7, which is integrally formed of polyacetal resin, polyamide resin, or the like in the same way as the rotation transmitting member 6 and is formed in the same way as the rotation transmitting member 6, is constructed in the same way as the rotation transmitting member 6 and includes an annular base portion 53 disposed concentrically with the coupling base portion 16 and having an inner peripheral surface 51 and an outer peripheral surface 52 which are cylindrical; four pairs of radial projecting portions 54 which are provided integrally with the base portion 53 in such a manner as to extend in the direction B from the cylindrical outer surface 52 of the base portion 53 and are arranged in such a manner as to be spaced apart from each other at equiangular intervals of 45° in the R direction; four grooves 55 having an identical depth and provided on the cylindrical inner peripheral surface 51 of the base portion 53 in such a manner as to extend in the A direction and to be spaced apart from each other at equiangular intervals of 90° in the R direction; and four retaining grooves 57 which are respectively connected to respective one ends of the grooves 55 and are provided on the inner peripheral surface 51 of the base portion 53, specifically on one end face 56 in the A direction of the base portion 53 opposing the end face 17.

Each of the radial projecting portions 54 has in the R direction a pair of side surfaces 58 and 59 serving as rigid rotation transmitting surfaces, and surfaces 60 of the respective radial projecting portions 54 opposing the elastic member 9 in the A direction are intermediately high in the R direction.

As for the rotation transmitting member 6 and the rotation transmitting member 7, the base portion 33 and the base portion 53 are arranged concentrically with each other with the elastic member 9 interposed therebetween, such that each of the radial projecting portions 34 and each of the radial projecting portions 54 face each other in the A direction.

The elastic member 9 has a smaller rigidity than the rotation transmitting members 6 and 7, is elastically deformable, and is formed integrally of a rubber elastomer such as urethane rubber, polyester elastomer, or the like. The elastic member 9 includes: an annular base portion 73 which is disposed between the base portions 33 and 53 in the A direction overlappingly in the A direction and concentrically with the base portions 33 and 53, and has a cylindrical inner peripheral surface 71 having a smaller diameter r1 than a diameter R1 of the inner peripheral surfaces 31 and 51 and a cylindrical outer peripheral surface 72 having a larger diameter R3 than a diameter r2 of the outer peripheral surfaces 32 and 52; four pairs of radial projecting portions 74 which are integrally provided on the base portion 73 in such a manner as to extend in the B direction from the cylindrical outer peripheral surface 72 of the elastically deformable base portion 73 with a smaller rigidity than the rigidity of the base portions 33 and 53 and are disposed between the radial projecting portions 34 and 54 in the A direction in such a manner as to be spaced apart from each other at equiangular intervals of 45° in the R direction, and which are elastically deformable with a smaller rigidity than the rigidity of the radial projecting portions 34 and 54 and have a greater width D than a width d in the R direction of the overlapped radial projecting portions 34 and 54; and eight recessed portions 77 which are provided in the inner peripheral surface 71 in such a manner as to be spaced apart from each other at equiangular intervals of 45° in the R direction and each have a recess 75 which is open at the inner peripheral surface 71 and a recess 76 communicating with the recess 75. The elastic member 9 is disposed by being sandwiched by the pair of rotation transmitting members 6 and 7 and in contact therewith at the surfaces thereof in the A direction, and the outer peripheral surface 72 is in contact with the inner peripheral surfaces 25 and 26 of the axial projecting portions 13 and 18.

The elastic member 9 is flat at a surface 78 thereof opposing the rotation transmitting member 6 and at a surface 79 thereof opposing the rotation transmitting member 7 in the A direction, and each of the radial projecting portions 74 having the greater width D than the width d in the R direction of the radial projecting portions 34 and 54 with the respective radial projecting portion 74 interposed therebetween has side surfaces 81 and 82 in the R direction.

The rotation transmitting members 6 and 7 and the elastic member 9 interposed therebetween are arranged concentrically such that the base portions 33 and 53 and the base portion 73, as well as the respective radial projecting portions 34 and 54 and the respective radial projecting portions 74, are arranged in a row in the A direction in face-to-face relation with each other in the A direction, and such that the grooves 35 and the recesses 76, as well as the grooves 55 and the recesses 76, are respectively arranged in a row in the A direction.

The shaft portion 19 has the same diameter as the diameter r1 of the inner peripheral surface 71 by leaving an insertion clearance, and is passed through and inserted in a through hole 83 defined by the inner peripheral surfaces 31 and 51 and the inner peripheral surface 71 in such a manner as to be brought into contact with the inner peripheral surface 71.

The coupling means 10 has four coupling members 92 which are integrally provided on the base portion 33 in such a manner as to extend from another end face 91 in the A direction of the base portion 33 toward the base portion 53 through the respective recesses 76 and to be spaced apart from each other at equiangular intervals of 90° in the R direction, and which are respectively latched at distal ends thereof by the base portion 53 at the retaining grooves 57 of the end face 56 in the A direction of the base portion 53; and four coupling members 94 which are integrally provided on the base portion 53 in such a manner as to extend from another end face 93 in the A direction of the base portion 53 toward the base portion 33 through the respective recesses 76 and to be spaced apart from each other at equiangular intervals of 90° in the R direction, and which are respectively latched at distal ends thereof by the base portion 33 at the retaining grooves 37 of the end face 36 in the A direction of the base portion 33.

Each of the coupling members 92 has a coupling base body 95 provided integrally with the base portion 33 in such a manner as to extend in the A direction and fitted tightly in the corresponding recess 76 and groove 55 and a hook 97 provided integrally on a radially outer surface 96 of the coupling base body 95 and latched by the end face 56 of the base portion 53 in the corresponding retaining groove 57. The coupling base body 95 has a radial thickness identical to the depth of the recess 76 and the groove 55 and has an inner peripheral surface 98 flush with the inner peripheral surfaces 31 and 51. Each of the coupling members 94 has a coupling base body 99 provided integrally with the base portion 53 in such a manner as to extend in the A direction and fitted tightly in the corresponding recess 76 and groove 35, as well as a hook 101 provided integrally on a radially outer surface 100 of the coupling base body 99 and latched by the end face 36 of the base portion 33 in the corresponding retaining groove 37. The coupling base body 99 has a radial thickness identical to the depth of the recess 76 and the groove 35 and has an inner peripheral surface 102 flush with the inner peripheral surfaces 51 and 31, the grooves 35 and 55 and recess 76 having a depth identical to each other.

Thus, provided in the inner peripheral surface 71 are the recesses 76 which are spaced apart from each other at equiangular intervals of 45° in the R direction and have an identical depth and in which the coupling base bodies 95 and 99 of the coupling members 92 and 94 are respectively fitted, each of the coupling base bodies 95 and 99 having a smaller radial thickness than the depth of the recess 76.

In the elastic member 9 and the rotation transmitting members 6 and 7 coupled to each other by the coupling means 10 with the elastic member 9 interposed therebetween, each of the axial projecting portions 13 of the coupling base body 3 is disposed in one gap between adjacent ones of the radial projecting portions 34 and 54 among the respective pairs of radial projecting portions 34 and 54 of the rotation transmitting members 6 and 7, i.e., in every other gap between adjacent ones of the radial projecting portions 34 and 54, as well as in one gap between adjacent ones of the radial projecting portions 74 among the respective pairs of radial projecting portions 74 of the elastic member 9, i.e., in every other gap between adjacent ones of the radial projecting portions 74, in the R direction. Meanwhile, each of the axial projecting portions 18 of the coupling base body 5 is disposed in another gap between adjacent ones of the radial projecting portions 34 and 54 among the respective pairs of radial projecting portions 34 and 54 of the rotation transmitting members 6 and 7, i.e., in every other remaining gap between adjacent ones of the radial projecting portions 34 and 54, as well as in another gap between adjacent ones of the radial projecting portions 74 among the respective pairs of radial projecting portions 74 of the elastic member 9, i.e., in every other remaining gap between adjacent ones of the radial projecting portions 74, in the R direction. In the relative rotation (twist) of the rotating shafts 2 and 4 by a fixed degree or less in the R direction, each axial projecting portion 13 of the coupling base body 3 at its side surfaces 21 and 22 in the R direction is in contact with the side surfaces 81 and 82 in the R direction of each radial projecting portion 74 of the elastic member 9 opposing thereto in the R direction, but is in non-contact with the side surfaces 38 and 58 as well as 39 and 59 of the radial projecting portions 34 and 54 of the rotation transmitting members 6 and 7 opposing thereto in the R direction. Meanwhile, each axial projecting portion 18 of the coupling base body 5 at its side surfaces 23 and 24 in the R direction is in contact with the side surfaces 81 and 82 in the R direction of each radial projecting portion 74 of the elastic member 9 opposing thereto in the R direction, but is in non-contact with the side surfaces 38 and 58 as well as 39 and 59 of the radial projecting portions 34 and 54 of the rotation transmitting members 6 and 7 opposing thereto in the R direction.

Each of the radial projecting portions 34 and 54 of the rotation transmitting members 6 and 7 which opposes the radial projecting portion 74 of the elastic member 9 in the A direction and is intermediately high in the R direction is, at its central portion in the R direction, brought into contact with each of the surfaces 78 and 79 of the corresponding radial projecting portion 74 in the opposing elastic member 9, and, meanwhile, forms, at the edge portion thereof in the R direction, a void space 111 with respect to each of the surfaces 78 and 79 of the corresponding radial projecting portion 74 in the opposing elastic member 9.

With the electric power steering apparatus equipped with the above-described shaft coupling mechanism 1 for mutually coupling the rotating shafts 2 and 4 so as to transmit the rotation of the rotating shaft 2 in the R direction to the rotating shaft 4, when the steering wheel is manually operated by the driver, the rotating shaft 4 is rotated in the R direction, and the rotation of the rotating shaft 4 in the R direction is transmitted to a drag link and the like as reciprocating motion through an unillustrated transmission mechanism such as gears, thereby imparting a steering force for steering control wheels (wheels). In the manual operation of the steering wheel by the driver, when the electric motor which is controlled by a detection signal from a torque detector for detecting the torque applied to the steering wheel is operated, the rotating shaft 2 is rotated in the R direction. The rotation of the coupling base body 3 in the R direction is then transmitted to the axial projecting portions 18 of the coupling base body 5 through the pressing toward the R direction against the radial projecting portions 34 and 54 by the axial projecting portions 13 on the basis of the contact of the side surfaces 21 with the side surfaces 38 and 58 or the contact of the side surfaces 22 with the side surfaces 39 and 59 after the deformation in the R direction of the radial projecting portions 74 by the axial projecting portions 13. As a result, the torque of the rotating shaft 2 in the R direction is added to the torque of the rotating shaft 4 in the R direction, thereby assisting the manual operation of the steering wheel by the driver.

With the shaft coupling mechanism 1, in both the state in which the steering wheel is not manually operated by the driver and the rotating shaft 4 is not rotated in the R direction and the state in which the steering wheel is manually operated by the driver and the rotating shaft 4 is rotated in the R direction, in a case where the relative rotation of the rotating shaft 2 in the R direction with respect to the rotating shaft 4 is of such a very small degree as to fall within less than about half a difference between the width D and the width d, the radial projecting portions 74 easily undergo compressive deformation. As a result, such a very small relative rotation of the rotating shaft 2 in the R direction is hardly transmitted to the rotating shaft 4. Thus, it is possible to reduce the transmission to the steering wheel of the impact at the time of the reversing and brush vibration of the electric motor through the shaft coupling mechanism 1 and the rotating shaft 4, thereby making it possible to prevent the steering feel from becoming uncomfortable. Moreover, after the compressive deformation of the radial projecting portions 74 by a fixed degree or more, the contact of the side surfaces 21 with the side surfaces 38 and 58 or the contact of the side surfaces 22 with the side surfaces 39 and 59 occur, which makes it possible to suppress any further compressive deformation of the radial projecting portions 74. As a result, it is possible to prevent the permanent set of the radial projecting portions 74 due to their creep. Hence, it is possible to maintain over extended periods of time the mutual contact between, on the one hand, the side surfaces 21 and 22 as well as 23 and 24 and, on the other hand, the side surfaces 81 and 82 in the R direction of the axial projecting portions 13 and 18 and the radial projecting portions 74, and therefore backlash is made difficult to occur between the rotating shaft 4 and the rotating shaft 2 in the R direction. Further, in cases where the rotating shaft 4 is rotated in the R direction by the manual operation of the steering wheel by the driver, followed by the rotation of the rotating shaft 2 in the R direction by the operation of the electric motor, and the rotating shaft 2 tends to be relatively rotated in the R direction with respect to the rotating shaft 4 by a fixed degree or more, i.e., by about a half the difference or more between the width D and the width d, the rotation transmitting members 6 and 7 transmit the rotation of the rotating shaft 2 in the R direction to the rotating shaft 4 in response to such relative rotation in the R direction by a fixed degree or more through the pressing toward the R direction against the radial projecting portions 34 and 54 by the axial projecting portions 13 on the basis of the contact of the side surfaces 21 with the side surfaces 38 and 58 or the contact of the side surfaces 22 with the side surfaces 39 and 59, so as to assist the rotation of the rotating shaft 4.

As described above, according to the shaft coupling mechanism 1, the elastic member 9 interposed between the rotation transmitting members 6 and 7 has the radial projecting portions 74 which are respectively disposed between the radial projecting portions 34 and 54 of the rotation transmitting members 6 and 7 in the A direction and each have the greater width D than the width d in the R direction of each of the radial projecting portions 34 and 54, and each radial projecting portion 74 of the elastic member 9 has a smaller rigidity than the rigidity of each of the radial projecting portions 34 and 54 of the rotation transmitting members 6 and 7. In consequence, the transmission of the rotation of the rotating shaft 2 in the R direction to the rotating shaft 4 is effected through the elastic deformation of the radial projecting portions 74 of the elastic member 9, so that the transmission of a very small degree of rotation of the rotating shaft 2 in the R direction to the rotating shaft 4 can be reduced or prevented by the elastic deformation of the radial projecting portions 74 of the elastic member 9. Meanwhile, the transmission to the rotating shaft 4 of a large degree of relative rotation of the rotating shaft 2 in the R direction with respect to the rotating shaft 4 can be effected as it is through the rotation transmitting members 6 and 7 having grater rigidity than the rigidity of the radial projecting portions 74 of the elastic member 9. Moreover, in the relative rotation of the rotating shaft 2 by a fixed degree or more in the R direction with respect to the rotating shaft 4, large elastic deformation of the radial projecting portions 74 of the elastic member 9 can be prevented by the rotation transmitting members 6 and 7 having greater rigidity. Therefore, even if a pliable resin material having a small rigidity is used for the elastic member 9, permanent set of the elastic member 9 due to creep can be reduced. Moreover, since the pair of rotation transmitting members 6 and 7 are coupled to each other through the coupling means 10, it is possible to improve assembling efficiency and eliminate the mutual separation of the pair of rotation transmitting members 6 and 7 in the A direction due to the elastic deformation of the elastic member 9, thereby making it possible to suppress the pair of rotation transmitting members 6 and 7 from spreading in the A direction to a fixed extent. Thus, it is possible to reduce the transmission to the steering wheel of the impact at the time of the reversing and brush vibration of the electric motor and eliminate backlash between the rotating shafts 2 and 4 in the R direction, thereby making it possible to prevent the steering feel from becoming uncomfortable and obtain excellent durability and stable characteristics.

In addition, according to the shaft coupling mechanism 1, since the elastic member 9 is positioned in the R direction with respect to the pair of rotation transmitting members 6 and 7 by means of both coupling members 92 and 94 of the coupling means 10, the effect derived from the elastic member 9 can be obtained uniformly with respect to the relative rotation in both R directions of the rotating shafts 2 and 4.

In addition, according to the shaft coupling mechanism 1, since the void space 111 is formed, the crushed bulge of an edge portion in the R direction of each radial projecting portion 74 of the elastic member 9, which is formed due to the compressive deformation, can be absorbed by the void space 111. As a result, it is possible to avoid the mutual separation of the radial projecting portions 34 and 54 of the pair of rotation transmitting members 6 and 7, which oppose each other in the A direction, and a portion of the radial projecting portion 74 of the elastic member 9 crushed due to compressive deformation is prevented from spreading to the side surfaces 38 and 39 as well as 58 and 59 of the radial projecting portions 34 and 54 and covering the side surfaces 38 and 39 as well as 58 and 59 of the radial projecting portions 34 and 54. In consequence, the permanent set of the radial projecting portions 74 of the elastic member 9 due to creep can be prevented more effectively, thus making it possible to maintain the rigidity in the R direction of the pair of rotation transmitting members 6 and 7 and effect stable transmission of torque.

In addition, according to the shaft coupling mechanism 1, since the inner peripheral surface 71 of the elastic member 9 has the smaller diameter r1 than the diameter R1 of the inner peripheral surfaces 31 and 51 of the rotation transmitting members 6 and 7, even if an axial misalignment occurs between the rotating shafts 2 and 4, it is possible to prevent the contact and collision of the shaft portion 19 with and against the inner peripheral surfaces 31 and 51 of the rigid rotation transmitting members 6 and 7 by the elastic member 9, thereby making it possible to suppress the generation of abnormal noise imparting an unpleasant steering feel to the driver. In addition, since each coupling base body 99 has a radial thickness identical to the depth of the recess 76 and the groove 35, the inward protrusion in the B direction of each coupling base body 99 from the recess 76 and the groove 35 can be eliminated, so that the contact and collision of the coupling base body 99 with and against the shaft portion 19 can be obviated, which also makes it possible to suppress the generation of abnormal noise imparting an unpleasant steering feel to the driver. Furthermore, since the outer peripheral surface 72 has the larger diameter R3 than the diameter r2 of the outer peripheral surfaces 32 and 52, even if an axial misalignment occurs between the rotating shafts 2 and 4, it is possible to prevent the contact and collision of the inner peripheral surfaces 25 and 26 of the axial projecting portions 13 and 18 with and against the outer peripheral surfaces 32 and 52 by the elastic member 9 and, hence, avoid the collision in the B direction between the axial projecting portions 13 and 18 and the base portions 33 and 53, which also makes it possible to suppress the generation of abnormal noise imparting an unpleasant steering feel to the driver.

Although the shaft coupling mechanism 1 in the above-described embodiment is comprised of the single elastic member 9, the shaft coupling mechanism 1 may alternatively be comprised of two or more elastic members 9, and each of the rotation transmitting members 6 and 7 may also be constituted by two or more rotation transmitting members. Also, the numbers of the axial projecting portions 13 and 18 of the coupling base bodies 3 and 5, the radial projecting portions 34 and 54 of the rotation transmitting members 6 and 7, the radial projecting portions 74 of the elastic member 9, and the coupling members 92 and 94 of the coupling means 10 as well as the recess 75 of the elastic member 9 are not limited to the aforementioned numbers. Additionally, the shaft portion 19 may be provided on the coupling base portion 11, and the shaft portion 19 may be constituted by an axial shaft end portion of at least one of the rotating shaft 2 or 4. Meanwhile, each coupling base body 99 may have a thickness in the B direction smaller than the sum of the depth of the recess 75 and the depth of the recess 76, i.e., the depth of the recessed portion 77.

DESCRIPTION OF REFERENCE NUMERALS

1: shaft coupling mechanism
2, 4: rotating shaft
3, 5: coupling base body
6, 7, 8: rotation transmitting member
9: elastic member
10: coupling means

The invention claimed is:

1. A shaft coupling mechanism for coupling a first rotating shaft and a second rotating shaft by being disposed between the first and the second rotating shafts so as to transmit the rotation of the first rotating shaft to the second rotating shaft, comprising: a first coupling base body which is coupled to the first rotating shaft; a second coupling base body which is coupled to the second rotating shaft; a rotation transmitting member; and an elastic member superposed on said rotation transmitting member in an axial direction, wherein the first coupling base body has a first coupling base portion and a first axial projecting portion projecting integrally in the axial direction from the first coupling base portion, and the second coupling base body has a second coupling base portion and a second axial projecting portion projecting integrally in the axial direction from the second coupling base portion, and at least one of the first coupling base body and the second coupling base body has a shaft which extends in the axial direction from a central portion of one axial end face thereof and is passed through a through hole defined by the first inner peripheral surface of the rotation transmitting member and a through hole defined by the second inner peripheral surface of said elastic member, wherein said rotation transmitting member includes a first base portion having a first inner peripheral surface and a first outer peripheral surface which are cylindrical and at least one pair of first radial projecting portions spaced apart from each other in a direction about an axis and extending radially from the first outer peripheral surface, and wherein said elastic member includes a second base portion superposed on the first base portion in the axial direction and having a second inner peripheral surface and a second outer peripheral surface which are cylindrical and at least one pair of second radial projecting portions respectively superposed on the first radial projecting portions of said rotation transmitting member in the axial direction and extending radially from the second outer peripheral surface, the second base portion having a smaller rigidity than a rigidity of the first base portion and being elastically deformable, each of the pair of second radial projecting portions having a smaller rigidity than a rigidity of the pair of first radial projecting portions, being elastically deformable, and having a greater width than a width in the direction about the axis of the first radial projecting portions superposed on the second radial projecting portions in the axial direction, an innermost peripheral surface of the second inner peripheral surface having a smaller diameter than a diameter of the first inner peripheral surface.

2. The shaft coupling mechanism according to claim 1, wherein said rotation transmitting member includes a first and a second rotation transmitting member, and said elastic member is interposed between said first and said second rotation transmitting members in the axial direction, each of said first and said second rotation transmitting members having the first base portion and the pair of first radial projecting portions, the second base portion being disposed between the first base portions of said first and said second rotation transmitting members in the axial direction, having a smaller rigidity than a rigidity of the first base portion of each of said first and said second rotation transmitting members, and being elastically deformable, the pair of second radial projecting portions being disposed between the first radial projecting portions of said first and said second rotation transmitting members in the axial direction, having a smaller rigidity than a rigidity of each of the pair of first radial projecting portions of said first and said second rotation transmitting members, being elastically deformable, and having a greater width than the width in the direction about the axis in the first radial projecting portions with the second radial projecting portions interposed therebetween in the axial direction, the second inner peripheral surface having a smaller diameter than the diameter of the first inner peripheral surface of each of said first and said second rotation transmitting members.

3. The shaft coupling mechanism according to claim 2, further comprising: coupling means for coupling said first and said second rotation transmitting members, wherein the coupling means includes a first coupling member provided integrally on the first base portion of said first rotation transmitting member in such a manner as to extend from one axial end face of the first base portion of said first rotation transmitting member toward the first base portion of said second rotation transmitting member and latched at a distal end thereof by the first base portion of said second rotation transmitting member at one axial end face of the first base portion of said second rotation transmitting member; and a second coupling member provided integrally on the first base portion of said second rotation transmitting member in such a manner as to extend from another axial end face of the first base portion of said second rotation transmitting member toward the first base portion of said first rotation transmitting member and latched at a distal end thereof by another axial end face of the first base portion of said first rotation transmitting member, and wherein recessed portions which are spaced apart from each other in the direction about the axis, and in which the first and the second coupling members are respectively fitted, are provided in the second inner peripheral surface.

4. The shaft coupling mechanism according to claim 3, wherein each of the first and the second coupling members has a coupling base body which is provided integrally with a corresponding one of the first base portions of said first and said second rotation transmitting members in such a manner as to extend in the axial direction and which is fitted in a corresponding one of the recessed portions and a hook provided integrally on a radially outer surface of the coupling base body and latched by the other axial end face of a corresponding one of the first base portions of said first and said second rotation transmitting members, each of the coupling base bodies having a smaller radial thickness than a depth of the recessed portions.

5. The shaft coupling mechanism according to claim 4, wherein each of the recessed portions has a first recess which is open at the second inner peripheral surface and a second recess which communicates with the first recess and in which a corresponding one of the coupling base bodies is fitted, and each of the coupling base bodies has a smaller radial thickness than a sum of a depth of the first recess and a depth of the second recess or a radial thickness identical to or smaller than the thickness of the depth of the second recess.

6. The shaft coupling mechanism according to claim 1, wherein the second outer peripheral surface has a greater diameter than a diameter of the first outer peripheral surface.

7. The shaft coupling mechanism according to claim 1, the first axial projecting portion being disposed in one gap between adjacent ones of the first radial projecting portions among the pairs of first radial projecting portions in the direction about the axis and in one gap between adjacent ones of the second radial projecting portions among the pairs of second radial projecting portions in the direction about the axis, the second axial projecting portion being disposed in another gap between adjacent ones of the first radial projecting portions among the pairs of first radial projecting portions in the direction about the axis and in another gap between adjacent ones of the second radial projecting portions among the pairs of second radial projecting portions in the direction about the axis.

8. The shaft coupling mechanism according to claim 7, wherein, in the relative rotation by a fixed degree or less of the first and the second rotating shafts, the first and the second axial projecting portions at respective side surfaces thereof in the direction about the axis are in contact with side surfaces in the direction about the axis of the second radial projecting portions opposing thereto in the direction about the axis, are adapted to be, in the relative rotation by the fixed degree or less of the first and the second rotating shafts, in non-contact with, and are adapted to be, in the relative rotation by the fixed degree or more of the first and the second rotating shafts, brought into contact with, side surfaces in the direction about the axis of the first radial projecting portions opposing thereto in the axial direction.

9. The shaft coupling mechanism according to claim 7, wherein the shaft is constituted by a shaft portion which is provided integrally on a central portion of the axial end face of at least one of the first coupling base body and the second coupling base body.

10. The shaft coupling mechanism according to claim 7, wherein the shaft is constituted by an axial shaft end portion of at least one of the first rotating shaft and the second rotating shaft.

11. The shaft coupling mechanism according to claim 7, wherein the second outer peripheral surface has a greater diameter than a diameter of the first outer peripheral surface.

12. The shaft coupling mechanism according to claim 7, wherein each of the first axial projecting portion and the second axial projecting portion has a radial inner surface which is brought into contact with the second outer peripheral surface.

13. The shaft coupling mechanism according to claim 1 for use in an electric power steering apparatus, wherein the first rotating shaft is adapted to be coupled to an output rotating shaft of an electric motor, and the second rotating shaft is adapted to be coupled to a steering shaft of an automobile.

14. A shaft coupling mechanism for coupling a first rotating shaft and a second rotating shaft by being disposed between the first and the second rotating shafts so as to transmit the rotation of the first rotating shaft to the second rotating shaft, comprising: a first and a second rotation transmitting member coupled to each other; and an elastic member interposed between said first and said second rotation transmitting members, wherein each of said first and said second rotation transmitting members includes a first base portion having a first inner peripheral surface and a first outer peripheral surface and at least one pair of first radial projecting portions spaced apart from each other in a direction about an axis and extending radially from the first outer peripheral surface, and wherein said elastic member includes a second base portion interposed between the first base portions of the first and the second rotation transmitting members in the axial direction and having a second inner peripheral surface and a second outer peripheral surface and at least one pair of second radial projecting portions interposed between the first radial projecting portions of said first and said second rotation transmitting members in the axial direction and extending radially from the second outer peripheral surface, the second base portion having a smaller rigidity than a rigidity of the first base portions of said first and said second rotation transmitting members and being elastically deformable, each of the pair of second radial projecting portions having a smaller rigidity than a rigidity of the pair of first radial projecting portions of each of said first and said second rotation transmitting members, being elastically deformable, and having a greater width than a width in the direction about the axis of the first radial projecting portions with the second radial projecting portions disposed therebetween in the axial direction, an innermost peripheral surface of the second inner peripheral surface having a smaller diameter than a diameter of the first inner peripheral surfaces of said first and said second rotation transmitting members.

15. The shaft coupling mechanism according to claim 14, wherein the second outer peripheral surface has a greater diameter than a diameter of the first outer peripheral surfaces of said first and said second rotation transmitting members.

16. A shaft coupling mechanism for coupling a first rotating shaft and a second rotating shaft by being disposed between the first and the second rotating shafts so as to transmit the rotation of the first rotating shaft to the second rotating shaft, comprising: a first coupling base body which is coupled to the first rotating shaft; a second coupling base body which is coupled to the second rotating shaft; a first and a second rotation transmitting member coupled to each other; and an elastic member interposed between said first and said second rotation transmitting members, wherein each of said first and said second rotation transmitting members includes a first base portion having a first inner peripheral surface and a first outer peripheral surface and at least one pair of first radial projecting portions spaced apart from each other in a direction about an axis and extending radially from the first outer peripheral surface, wherein said elastic member includes a second base portion interposed between the first base portions of the first and the second rotation transmitting members in the axial direction and having a second inner peripheral surface and a second outer peripheral surface and at least one pair of second radial projecting portions interposed between the first radial projecting portions of said first and said second rotation transmitting members in the axial direction and extending radially from the second outer peripheral surface, wherein the first coupling base body has a first coupling base portion and a first axial projecting portion projecting integrally in the axial direction from the first coupling base portion, and the second coupling base body has a second coupling base portion and a second axial projecting portion projecting integrally in the axial direction from the second coupling base portion, and at least one of the first coupling base body and the second coupling base body has a shaft which extends in the axial direction from a central portion of one axial end face thereof and is passed through a first through hole defined by the first inner peripheral surface of the first rotation transmitting member, a second through hole defined by the second inner peripheral surface of the second rotation transmitting member and a third through hole defined by the second inner peripheral surface of said elastic member, wherein said second base portion has a smaller rigidity than a rigidity of the first base portions of said first and said second rotation transmitting members and being elastically deformable, and wherein said each of the pair of second radial projecting portions has a smaller rigidity than a rigidity of the pair of first radial projecting portions of each of said first and said second rotation transmitting members, being elastically deformable, and having a greater width than a width in the direction about the axis of the first radial projecting portions with the second radial projecting portions disposed therebetween in the axial direction, and wherein an innermost peripheral surface of the second inner peripheral surface having a smaller diameter than a diameter of the first inner peripheral surfaces of said first and said second rotation transmitting members.

* * * * *